(12) United States Patent
Kolze

(10) Patent No.: US 7,305,049 B2
(45) Date of Patent: *Dec. 4, 2007

(54) CHARACTERIZING CHANNEL RESPONSE IN A SINGLE UPSTREAM BURST USING REDUNDANT INFORMATION FROM TRAINING TONES

(75) Inventor: Thomas J. Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/590,388

(22) Filed: Oct. 31, 2006

(65) Prior Publication Data

US 2007/0041477 A1 Feb. 22, 2007

Related U.S. Application Data

(63) Continuation of application No. 10/112,567, filed on Mar. 30, 2002, now Pat. No. 7,139,331.

(51) Int. Cl.
*H03K 9/00* (2006.01)

(52) U.S. Cl. .................................... 375/316
(58) Field of Classification Search .............. 375/316, 375/295

See application file for complete search history.

(56) References Cited

U.S. PATENT DOCUMENTS 6,192,026 B1 * 2/2001 Pollack et al. .............. 370/203
6,850,481 B2 * 2/2005 Wu et al. .................. 370/208
2003/0012308 A1 * 1/2003 Sampath et al. ............ 375/340
2003/0099304 A1 * 5/2003 Gore et al. ................. 375/267

OTHER PUBLICATIONS

Ayanoglu, Broadband Wireless Internet Forum white paper, "VOFDM Broadband Wireless Transmission and Its Advantages over single Carrier Modulation", Dec. 15, 2000 pp. 1-35.*
Ayanoglu, "Broadband Wireless Internet Forum presentation", WCAI Jun. 25, 2001. pp. 1-15.*
Ayanoglu, "VOFDM braodband wireless transmission and its advantages over single carrier modulation", ICC 2001. IEEE International Conference on Communications, 2001. vol. 6, Jun. 11-14, 2001 pp. 1660-1664 vol. 6.*

(Continued)

*Primary Examiner*—Mohammed Ghayour
*Assistant Examiner*—Juan Alberto Torres
(74) *Attorney, Agent, or Firm*—Garlick Harrison & Markison; Shayne X. Short

(57) ABSTRACT

Characterizing channel response in a single upstream burst using redundant information from training tones (TTs). The invention is operable to utilize inserted TTs, contained within a transmitted data frame, to provide for an improved estimate of a communication channel's actual response and an improved estimate of the noise of the communication channel. The invention determines a maximum allowable delay spread of the many communication paths within a multi-path communication channel. Using the redundant TTs information then a portion of the finite impulse response of the communication channel, within the time domain, may be zeroed, thereby providing a much improved channel estimate and noise estimate. Using the redundant TTs, less noise is introduced onto the data tones (DTs) within a data frame. The present invention is also able to identify those portions of the TTs that are attributable to the actual channel and those that are attributable to the channel's noise.

20 Claims, 7 Drawing Sheets

OTHER PUBLICATIONS

Rine, "Pilot spacing in orthogonal frequency division multiplexing systems on practical channels".IEEE Trans Comsumer Electronics, 1996,42(4):959-962.*

Negi, "Pilot tone selection for channel estimation in a mobile OFDM system," IEEE Trans. Consum. Electron., vol. 44, No. 3, pp. 1122-1128, Aug. 1998.*

* cited by examiner

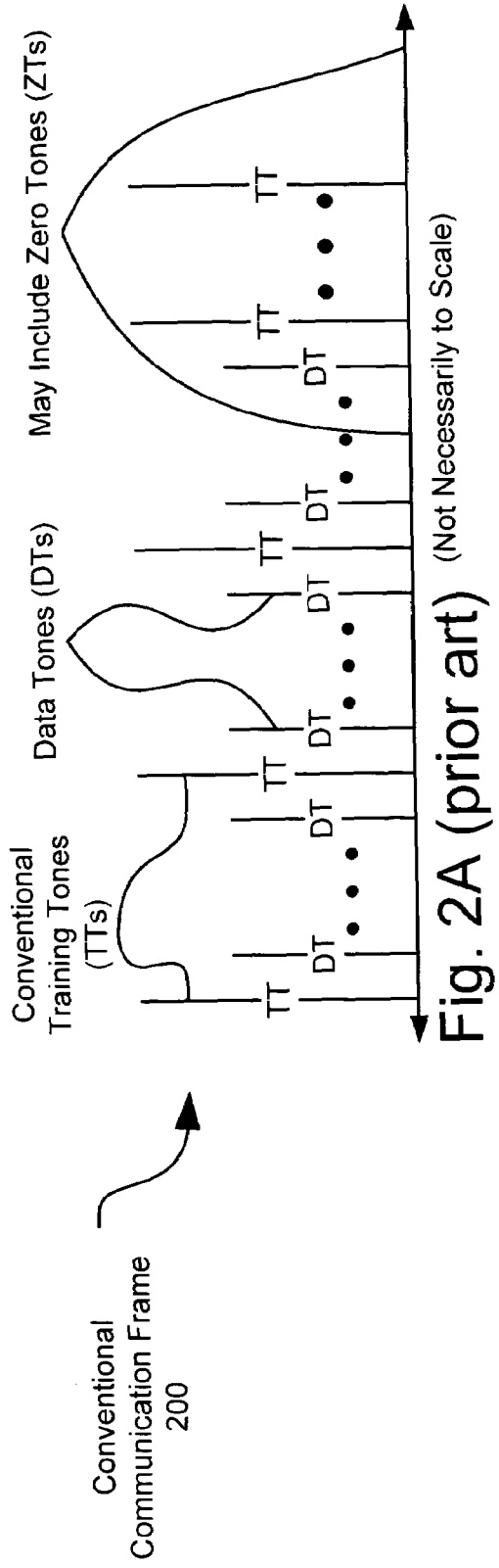
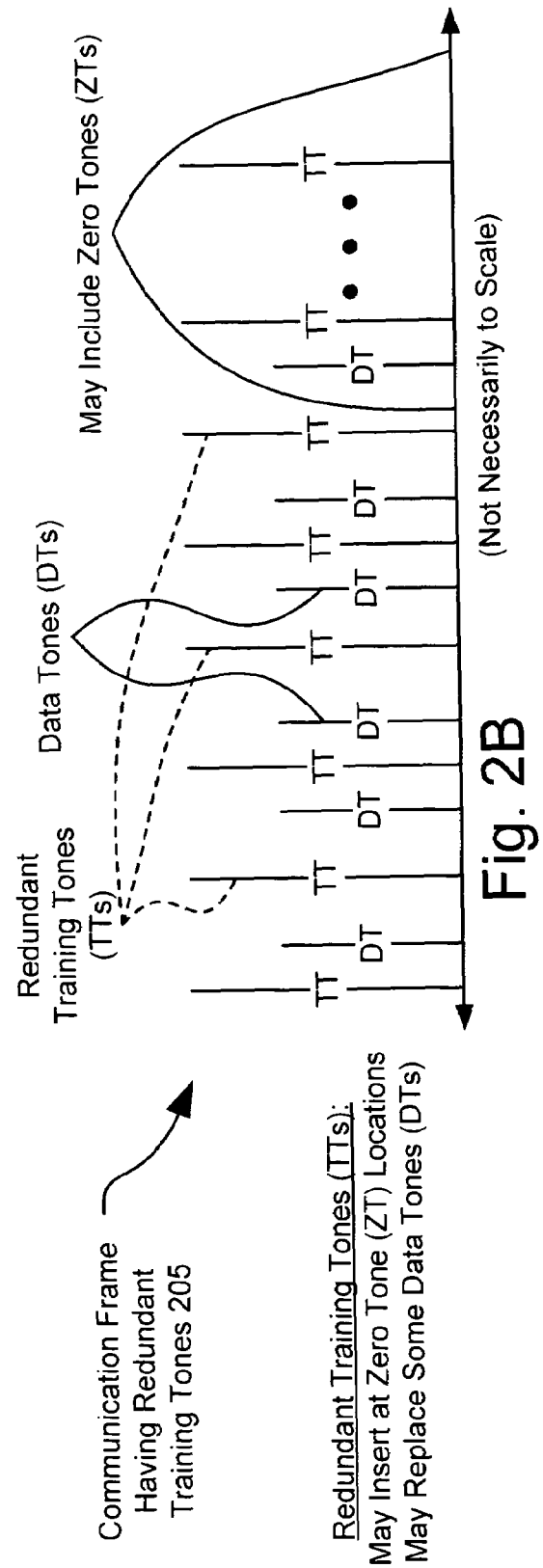

CHARACTERIZING CHANNEL RESPONSE IN A SINGLE UPSTREAM BURST USING REDUNDANT INFORMATION FROM TRAINING TONES

CROSS REFERENCE TO RELATED PATENTS/PATENT APPLICATIONS

Continuation Priority Claim, 35 U.S.C. § 120

The present U.S. Utility patent application claims priority pursuant to 35 U.S.C. § 120, as a continuation, to the following U.S. Utility patent application which is hereby incorporated herein by reference in its entirety and made part of the present U.S. Utility patent application for all purposes:

1. U.S. Utility application Ser. No. 10/112,567, entitled "CHARACTERIZING CHANNEL RESPONSE IN A SINGLE UPSTREAM BURST USING REDUNDANT INFORMATION FROM TRAINING TONES," filed Mar. 30, 2002, now U.S. Pat. No. 7,139,331.

Incorporation by Reference

The following U.S. Utility patent applications are hereby incorporated herein by reference in their entirety and made part of the present U.S. Utility patent application for all purposes:

1. U.S. Utility patent application Ser. No. 10/109,978, entitled "OPTIMAL DECISION METRIC APPROXIMATION IN BIT-SOFT DECISIONS," filed Mar. 30, 2002, pending.

2. U.S. Utility patent application Ser. No. 10/112,128, entitled "FREQUENCY DRIFT AND PHASE ERROR COMPENSATION IN A VOFDM RECEIVER," filed Mar. 30, 2002, pending.

3. U.S. Utility patent application Ser. No. 10/112,009, entitled "MODIFIED BRANCH METRICS FOR PROCESSING SOFT DECISIONS TO ACCOUNT FOR PHASE NOISE IMPACT ON CLUSTER VARIANCE," filed Mar. 30, 2002, pending.

4. U.S. Utility patent application Ser. No. 10/114,023, entitled "VOFDM RECEIVER CORRELATION MATRIX PROCESSING USING FACTORIZATION," filed Mar. 30, 2002, now U.S. Pat. No. 6,947,715, issued on Sep. 20, 2005.

BACKGROUND OF THE INVENTION

1. Technical Field of the Invention

The invention relates generally to communication systems; and, more particularly, it relates to a system and method that are operable to provide for improved communication channel estimation using information provided by redundant training tones (TTs)/pilot tones.

2. Description of Related Art

Communication systems transmit digital data through imperfect communication channels. These symbols may undergo some undesirable corruption due to the imperfection of the communication channel. One effort to try to avoid such situations is focused on performing forward error correction (FEC) coding. However, there is typically some difficulty in extracting the information contained within these symbols after they have been undesirably altered within the communication channel. There exist some methods that seek to curb the effect that the communication channel has had on the data; one such method includes employing using Decision Feedback Equalizers (DFEs). However, even after the incoming signal has been equalized, the extraction of the data, that has undergone some alteration due to the channel effects, is still a probabilistic determination. Many communication systems seek to estimate the actual channel response of a communication channel. Of the many deficiencies that may be introduced in doing this, one major problem is the undesirable introduction of noise into both the estimate of the channel response as well as the estimate of the channel noise within the communication system.

A current implementation of the Vector Orthogonal Frequency Division Multiplexing (VOFDM) standard employs a methodology for characterizing the channel response according to the following: pilot tones or training tones (PTs or TTs) are sampled during multiple sampling periods that are separated in time. Each sampling period corresponds to a block of symbols that has been modulated using the VOFDM method of translating the symbols into the transmission waveform via an FFT operation. Each such block of symbols and their resulting FFT-generated waveform will henceforth be termed a frame. In general, a transmission burst consists of multiple frames. TTs are then sampled for each of the frames in a burst transmission. The TTs from a single frame can be processed to produce an estimate of the actual communication channel's channel response embedded in noise. A noise channel estimate may be referred to as a noisy channel response. The TT samples from a multiplicity of frames are processed to produce the estimate of the channel response. Generally speaking, the average of the multiplicity of noisy channel responses is considered to be the channel response, while the difference between noisy channel responses and this average is considered to be noise. Noise estimates are necessary in the VOFDM processing, as well as within processing a channel response estimate.

As an example, an embodiment employing two frames in a transmission burst is considered. The two TT sample groups (TTs in frame one, and TTs in frame two) are processed to produce their noisy channel responses, and these two noisy channel responses are averaged to produce the channel response. The difference between the two TT samples' noisy channel responses is considered to be noise of the communication channel.

While this prior art methodology may appear to work satisfactorily for very slowly time varying channels or for non-time varying channels (static communication channels), the prior art methodology simply fails to produce a channel response that adequately tracks rapidly changing channels. Also, this methodology requires a minimum of two upstream frames per upstream transmission burst, unless it is otherwise guaranteed that multiple grants, closely spaced in time, are provided for each user.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 2A is a two-dimensional (2-D) graph diagram illustrating an embodiment of a conventional communication frame.

FIG. 2B is a two-dimensional (2-D) graph diagram illustrating an embodiment of a communication frame having redundant training tones (TTs) that is arranged in accordance with certain aspects of the present invention.

DETAILED DESCRIPTION OF THE INVENTION

Figure 1:
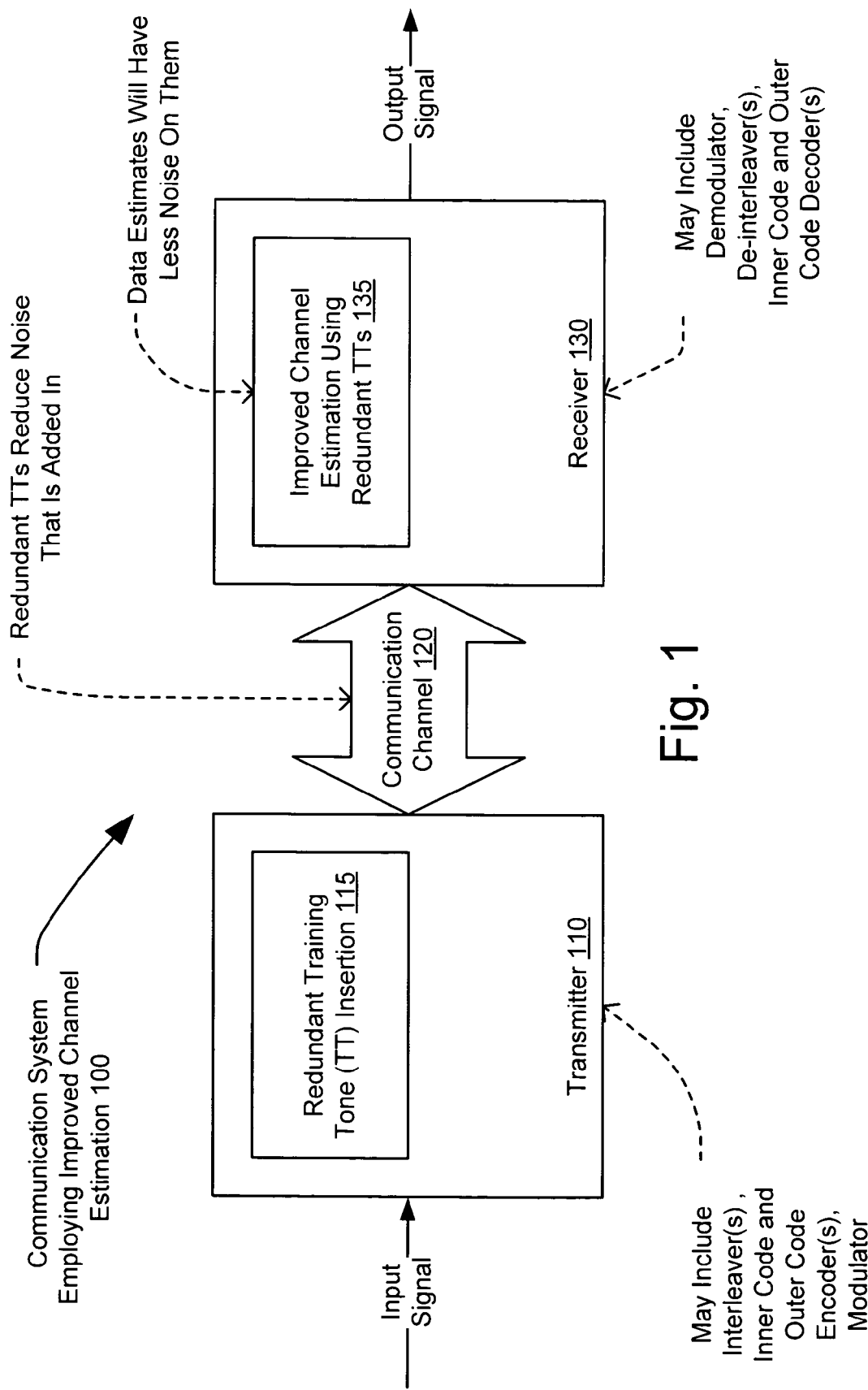
FIG. 1 is a system diagram illustrating an embodiment of a communication system employing improved channel estimation that is built in accordance with certain aspects of the present invention.

The present invention is operable within any number of communication systems that calculate estimates of a communication channel's actual communication channel. The present invention is able to utilize redundant training tones (TTs) that have been inserted into a data frame. As will be understood within the various embodiments of the present invention, the redundant TTs provide for an improved estimate of a communication channel's actual channel response and also an improved estimate of the communication channel's noise.

The present invention is operable within the vector orthogonal frequency division multiplexing (VOFDM) portion of the broadband wireless internet forum (BWIF) standard set. The VOFDM standard defines the physical layer and additional layers in which a plurality, e.g., up to 1,024 separate carriers (tones) carry either data (data tones or DTs) or training tones (TTs)/pilot signals (pilot tones or PTs) and in some instances zero tones (ZTs). The terminology of training tones (TTs) and pilot tones (PTs) are synonymous within the following description. In a data frame, there are one or more of TTs/PTs, data tones (DTs), and zero tones (ZTs). The present invention employs a higher number of TTs for the same number of DTs than are presently employed within prior art communication systems.

The 1,024 tones are separated in frequency such that they are orthogonal to one another. The VOFDM standard also defines a multi-antenna receive path that combines the signal received via each of the antennae using a combining methodology.

Again, the present invention is operable within communication systems employing a variety of modulation coding schemes including QPSK, 16 QAM, 64 QAM, 256 QAM, and 1024 QAM.

As described above, the prior art methodologies work satisfactorily for slowly time varying channels or for non-time varying channels, yet the prior art methodology fails to produce a channel response that adequately tracks rapidly changing channels. Also, the prior art methodology requires a minimum of two upstream frames per upstream transmission burst, unless it is otherwise guaranteed that multiple grants, closely spaced in time, are provided for each user.

The present invention employs redundant TTs into the VOFDM spectra, and the present invention also employs them during a single upstream frame to characterize the channel response. In one embodiment, twice as many pilot tones are employed as are required by the VOFDM standard. With this spacing, the TTs are spaced more closely than is required for Nyquist sampling of the channel response; more TTs are included within a data frame than are included within prior art data frames.

In one particular operation in the present invention, adjacent TTs are sampled and correlated. The correlation of these adjacent TTs allows for a quick characterization of the channel response for the particular frequency spectra. Because the channel is characterized for a single upstream frame, a quickly varying channel may be more accurately characterized with this characterization subsequently used in the processing of related data. Because the TTs are more closely spaced than is required for a Nyquist sampling of the channel response, the characterization of the channel in a single frame may be sufficient to produce an accurate estimate of the channel response.

In another embodiment of the present invention, the introduced redundant TTs are processed to enhance the quality of the channel response, even while the channel characterization employs a multiplicity of frames in a burst. Thus, even though multiple frames are employed in generating the channel response estimate, the invention provides improved performance by using the redundant TTs to increase the fidelity of the channel response estimate. In adjunct with the system and method employed in accordance with the present invention, the number of redundant TTs that should be included may be learned; alternatively, the number may be determined analytically or using a combination of analytical and experimental (learned) means may be used. The learning may be performed by observing the results of previous transmissions from the same transmitter, perhaps, that with a given number of pilot tones in the frame, there is redundancy (say less than 50%). With this knowledge, the present invention may be applied to take advantage of this redundancy to increase the fidelity of the channel response estimate. This technique of using ascertained redundancy in the TTs to increase the fidelity of the channel response estimate and it may be applied to the continuous downstream transmissions, as well as the upstream transmissions.

If the channel impulse response is shorter (in the time domain) than allowed for by the waveform's TTs, the present invention is operable to use this margin to increase the fidelity of the channel response estimate. The waveform can then estimate longer channel impulse responses than is able using prior art approaches.

The functionality of the functional blocks described below in the various embodiments of the present invention may be implemented using hardware circuitry and software (supported on some platform) and/or a combination of hardware and software.

FIG. 1 is a system diagram illustrating an embodiment of a communication system 100 employing improved channel estimation that is built in accordance with certain aspects of the present invention. The communication system 100 includes a transmitter 110, a communication channel 120, and a receiver 130. The transmitter 110 takes an input signal and performs any necessary modulation, encoding, and/or interleaving and then prepares that signal for transmission to the receiver 130 via the communication channel 120. In addition, the transmitter 110 is operable to perform redundant training tone (TT) insertion, as shown in a functional block 115, into one or more data frames that are prepared for transmission via the communication channel 120. As will be understood in even greater detail within the following description, the redundant and inserted TTs enable a better channel estimate for the communication channel 120 and also ensure that less noise is introduced to data that are transmitted via the communication channel 120. It is also noted that the transmitter 110 may include modulators, outer code encoders, inner code encoders, and interleavers; the receiver 130 may include demodulators, inner code decoders, outer code decoders, and de-interleavers.

The receiver 130 is operable to perform improved channel estimation using the redundant TTs, as shown in a functional block 135. The redundant TTs enable the signal processing within the receiver 130 to zero out an entire portion of the time domain response of the channel estimate that is beyond the maximum allowable delay spread that may be incurred within the communication channel 120. The redundant TTs may be used to increase the fidelity of the channel estimate. From other perspectives, the redundant TTs may be viewed as extending the Nyquist time over which the signal may be resolved within the receiver 130. Again, this provides for a more accurate channel estimate and for an improved estimate of the noise in the channel. The communication system 100 also enables the receiver 130 to separate better the actual channel response (via the channel estimate) from the noise induced within the communication channel 120. The present invention allows for more averaging of noise contained within a data frame than is allowed within present communication systems.

Using the improved channel estimate and improved characterization of channel noise offered by the redundant TTs, the receiver 130 then generates an output signal that represents a best estimate of the original input signal that is provided to the transmitter 110; the output signal represents the actual data that the receiver 130 extracts from the signal it receives from the transmitter 110 via the communication channel 120.

It is also noted that each of the transmitter 110 and the receiver 130 may themselves be contained within transceivers without departing from the scope and spirit of the invention; that is to say, each of the transmitter 110 and the receiver 130 may be included within similar types of device (transceivers) so that both ends of the communication channel 120 may perform the functionality described in the functional blocks 115 and 135.

FIG. 2A is a two-dimensional (2-D) graph diagram illustrating an embodiment of a conventional communication frame 200. The conventional communication frame 200 includes a number of data tones (DTs) and conventional training tones (TTs); the conventional communication frame 200 may also include a number of zero tones (ZTs). The conventional communication frame 200 is not necessarily shown to scale. For example, there may be any indefinite number of DTs in between the TTs; one or more ZTs may also be interspersed between the various DTs and TTs. In the prior art, the total number of conventional training tones (TTs) is typically selected and fixed based on the supposed maximum delay spread associated with the communication system.

FIG. 2B is a 2-D graph diagram illustrating an embodiment of a communication frame 205 having redundant training tones (TTs) that is arranged in accordance with certain aspects of the present invention. The communication frame 205 includes a number of data tones (DTs) and a number of redundant TTs that exceeds the number of conventional TTs employed within the FIG. 2A; the communication frame 205 may also include a number of zero tones (ZTs). The communication frame 205 is not necessarily shown to scale. For example, there may be any indefinite number of DTs in between the TTs; one or more ZTs may also be interspersed between the various DTs and TTs. The redundant TTs may be included in the spaces of the ZTs, or they may be situated in place of one or more of the DTs. The ratio of DTs to TTs is less than that of the FIG. 2A; that is to say, there are more TTs for the same number of DTs within the FIG. 2B when compared to the FIG. 2A.

Figure 3A:
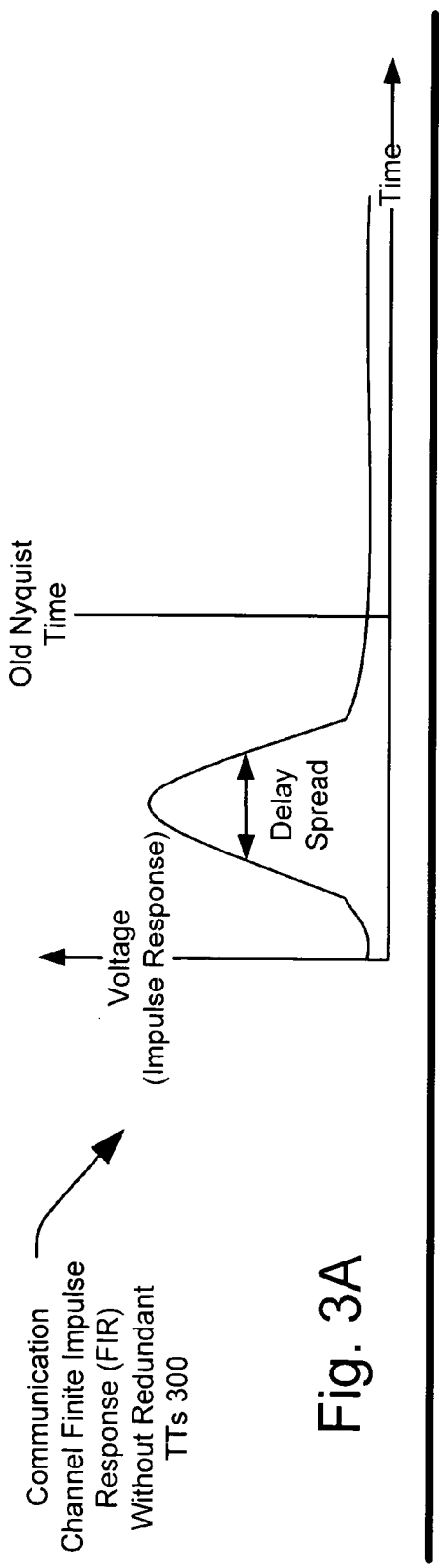
FIG. 3A is a two-dimensional (2-D) graph diagram illustrating an embodiment of a communication channel's finite impulse response (FIR) that does not have the benefit of redundant training tones (TTs).

FIG. 3A is a 2-D graph diagram illustrating an embodiment of a communication channel's finite impulse response (FIR) 300 that does not have the benefit of redundant training tones (TTs). The FIR of a communication channel incurs a delay spread, and the remainder of the FIR is substantially noise. Within a multi-path communication channel, where some of the transmission paths reflect and bounce off of different elements within the communication channel (e.g., buildings, mountains, trees, and/or other elements), there is one path that provides the largest, maximum delay of all of the possible communication paths within the various paths within the communication channel; this maximum delay determines the "old" Nyquist time, which is one-half of the inverse of the spacing of the training tones in the transmission. The "old" Nyquist time must be greater than this maximum delay.

Figure 3B:
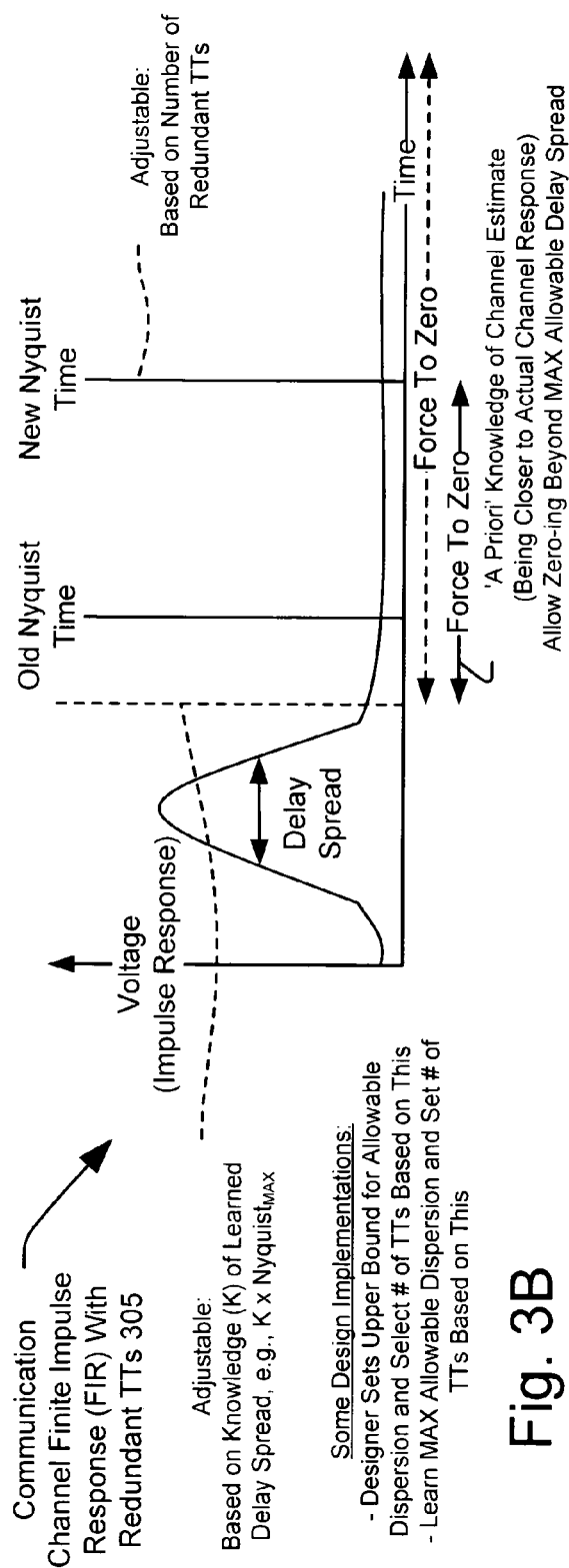
FIG. 3B is a two-dimensional (2-D) graph diagram illustrating an embodiment of a communication channel's finite impulse response (FIR) that has the benefit of redundant training tones (TTs) that are inserted in accordance with certain aspects of the present invention.

FIG. 3B is a 2-D graph diagram illustrating an embodiment of a communication channel's FIR 305 that has the benefit of redundant training tones (TTs) that are inserted in accordance with certain aspects of the present invention. The maximum allowable delay spread within the communication channel is learned using any number of various means, some of which are described herein. The determination of the maximum allowable delay spread, based on the introduction of the redundant TTs, allows for the determination of a "new" Nyquist time; this "new" Nyquist time is adjustable depending on the total number of redundant TTs that are inserted into the data frame.

This 'a priori' knowledge of the communication channel's maximum allowable delay spread and the corresponding "new" Nyquist time, in that it is now closer to the actual communication channel's response, the present invention allows for zero-ing of the time domain response beyond the maximum allowable delay spread. This will in turn prevent the introduction of a significant amount of noise when compared to prior art embodiments that do not allow for zero-ing of a portion of the time domain's FIR. If desired, a design engineer, when implementing these aspects of the present invention, may set an upper bound for the maximum allowable delay spread and then select the number of TTs that should be inserted within a data frame. Alternatively, when the maximum allowable delay spread within the communication channel is determined empirically or experimentally (or learned) as the system learns the maximum allowable delay spread, then the number of TTs that should be inserted within a data frame may be selected based on the maximum allowable delay spread that is determined this way. Regardless of the way in which this is selected, the communication receiver then selects the number of redundant training tones that should be used based on the maximum allowable delay spread.

It is also noted that the design engineer may select into which data frames the redundant TTs should be inserted. For example, a particular implementation may be such that redundant TTs are inserted into every other frame, or every N number of frames; the spacing between those data frames that actually contain redundant TTs may be programmable by the design engineer, and the spacing may not be equal in every instance.

Figure 4:
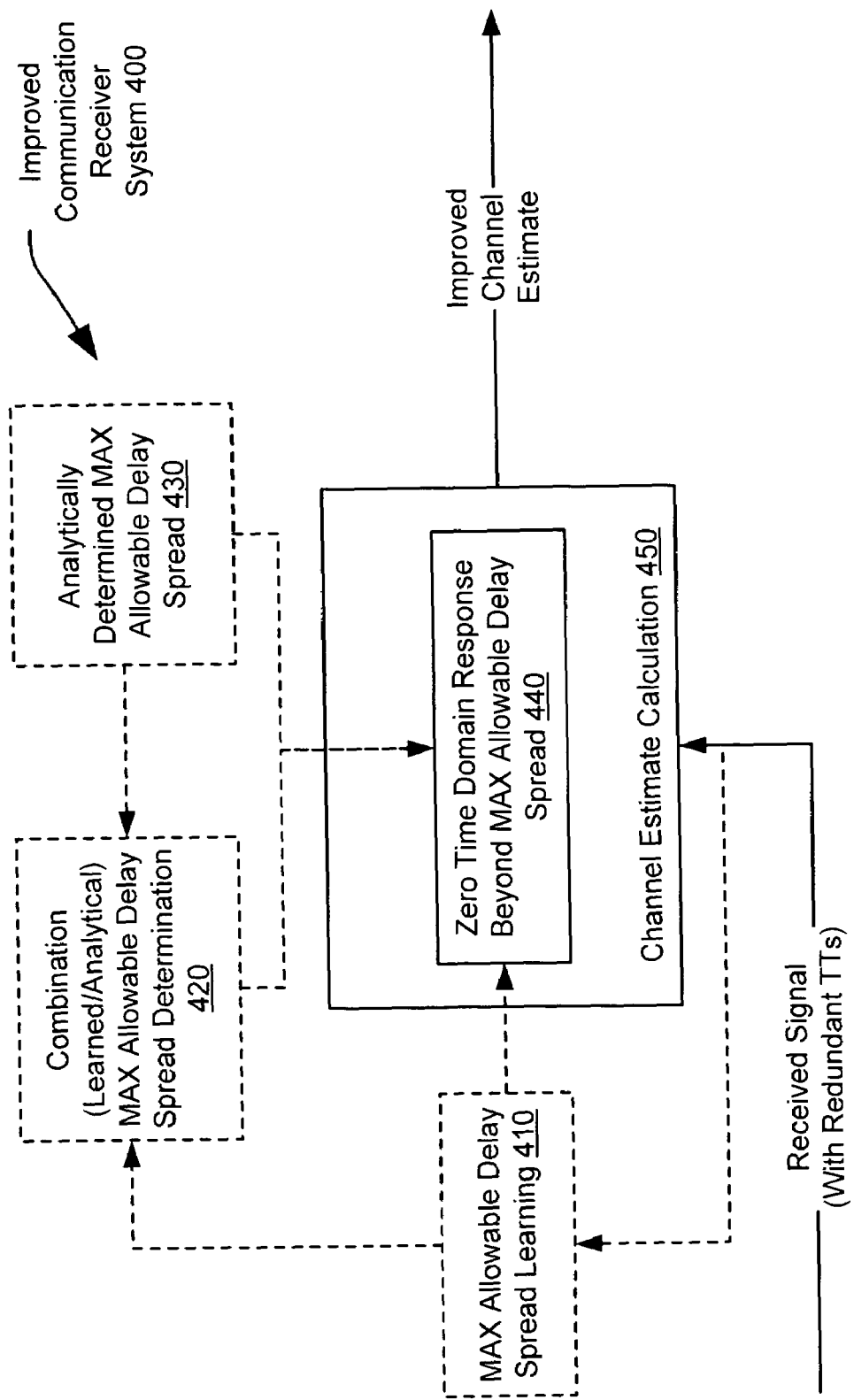
FIG. 4 is a system diagram illustrating an embodiment of an improved communication receiver system that is built in accordance with certain aspects of the present invention.

FIG. 4 is a system diagram illustrating an embodiment of an improved communication receiver 400 system that is built in accordance with certain aspects of the present invention. A received signal is provided to a functional block that performs channel estimate calculation 450. Within the functional block 450, the present invention is operable to zero the time domain response beyond a maximum allowable delay spread within a communication channel. This allows for an improved estimate of the actual channel response and an improved channel noise estimate. Then, the present invention provides an improved channel estimate from the functional block 450 that may be used in any and all subsequent signal processing within a communication receiver.

In alternative embodiments, the received signal is also provided to a functional block that performs learning of the maximum allowable delay spread, as shown in a functional block 410. This learning may be performed over a predetermined period of time in which a sufficient number of data frames are received by the improved communication receiver system 400. The period of time or number of data frames may be user-programmed or adaptively selected in various embodiments. This learned information, relating to the maximum allowable delay spread within the communication channel, is provided to the functional block 440 within the functional block 450.

In even other embodiments, the maximum allowable delay spread may be determined analytically as shown in a functional block 430; this analytical analysis may be performed entirely off-line in certain embodiments using estimated characteristics of a communication system in which the improved communication receiver system 400 resides. If desired, a design engineer may select the maximum allowable delay spread as being related to the most dispersed user within a communication receiver system. A variety of parameters may be used to perform this analytical determination of the maximum allowable delay spread within the functional block 430, some of which will be described below in other embodiments.

In even other embodiments, the information derived analytically within the functional block 430 and the information that is learned in the functional block 410 may both be combined to provide for the information used to determine the maximum allowable delay spread. The information derived within the functional blocks 410 and 430 are both provided to a functional block 420 in this embodiment; combination (learned/analytical) maximum allowable delay spread determination is performed using includes information that is learned and that is generated analytically. There are a number of manners in which these two inputs may be combined to provide for information to calculate the confidence level in the functional block 440 without departing from the scope and spirit of the invention.

Figure 5:
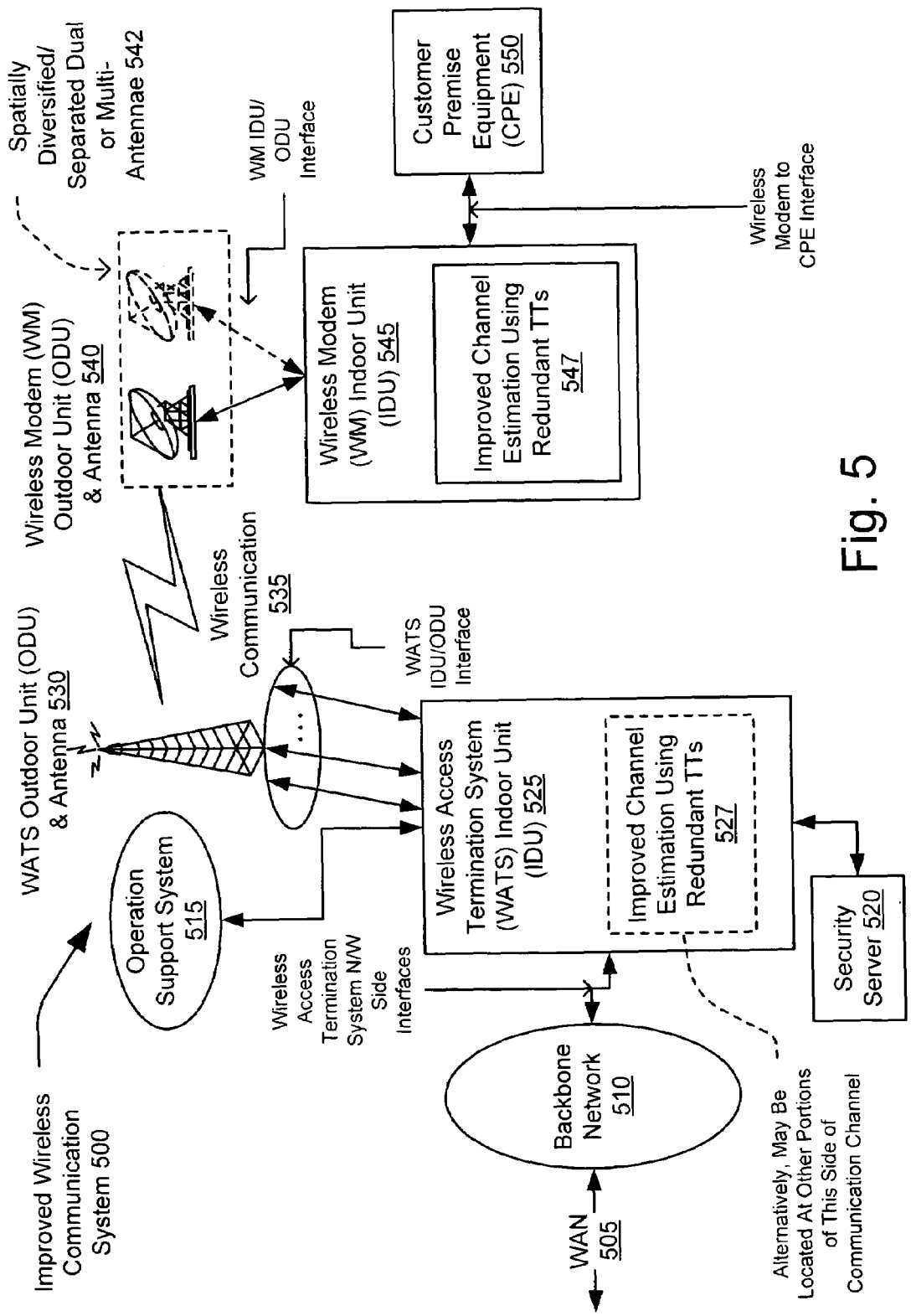
FIG. 5 is a system diagram illustrating an embodiment of an improved wireless communication system that is built in accordance with certain aspects of the present invention.

FIG. 5 is a system diagram illustrating an embodiment of an improved wireless communication system 500 that is built in accordance with certain aspects of the present invention. The present invention is operable within the improved wireless communication system 500 that employs the vector orthogonal frequency division multiplexing (VOFDM) portion of the broadband wireless Internet forum (BWIF) standard set. The VOFDM standard defines the physical layer and additional layers in which a plurality, e.g., up to 1,024 separate carriers (tones) carry either data (data tones) or training/pilot signals (training/pilot tones). The 1,024 tones are separated in frequency such that they are orthogonal to one another. The VOFDM standard also defines a multiple antennae receive path that combines the signal received via each of the antennae using a combining methodology. In the receiver of a VOFDM device (sometimes referred to as a wireless modem (WM) indoor unit (IDU)), a decision block maps incoming voltage signals corresponding to a particular symbol to a modulation constellation in order to extract bits carried by the symbol.

Here, the present invention is operable to provide for improved decoding of the received voltage signal that is provided to a wireless modem (WM) indoor unit (IDU) 545; improved channel estimation using redundant training tones (TTs) (as shown in functional block 547) is performed within the WM IDU 545 is performed, as necessary, to ensure proper demodulation/decoding of the signals received by the WM IDU 545.

The improved wireless communication system 500 may be viewed in light of the wireless communication system reference architecture of the BWIF; the present invention provides for improved signal processing within the WM IDU 545. A wide area network 505 communicatively couples to a backbone network 510. The backbone network 510 in turn communicatively couples to a wireless access termination system (WATS) indoor unit (IDU) 525. Redundant training tones (TTs) may be inserted within the WATS IDU 525 (as shown in functional block 527); alternatively, the redundant TTs may be inserted at another location within this side of the wireless communication channel (shown as wireless communication 535).

The WATS IDU 525 is serviced via operation system support 515 and a security server 520. The WATS IDU 525 is operable to communicate with a WATS outdoor unit (ODU) and antenna 530 using one or more signals. The present invention implements vector orthogonal frequency division multiplexing (VOFDM) where the signal is partitioned among a number of frequencies. The WATS ODU 530 communicates with a wireless modem (WM) outdoor unit (ODU) and antenna 540 via wireless communication 535. If desired, the WM ODU and antenna 540 is implemented in a spatially diversified/separated dual or multi-antennae implementation 542.

The WM ODU and antenna 540 provides the one or more signals to the WM IDU 545 that is operable to perform improved channel estimation using redundant TTs using the functional block 547. The WM IDU 545 communicatively couples to a customer premises equipment (CPE) 550. The FIG. 5 shows just one embodiment where a communication system may benefit from the functionality offered by the present invention in performing improved channel estimation using redundant TTs based on a maximum allowed delay spread over the communication channel.

It is noted that the functionality offered by the present invention may be performed in both transmit/receive paths without departing from the scope and spirit of the invention, as shown by the functionality within the functional blocks 547 and 527.

Figure 6:
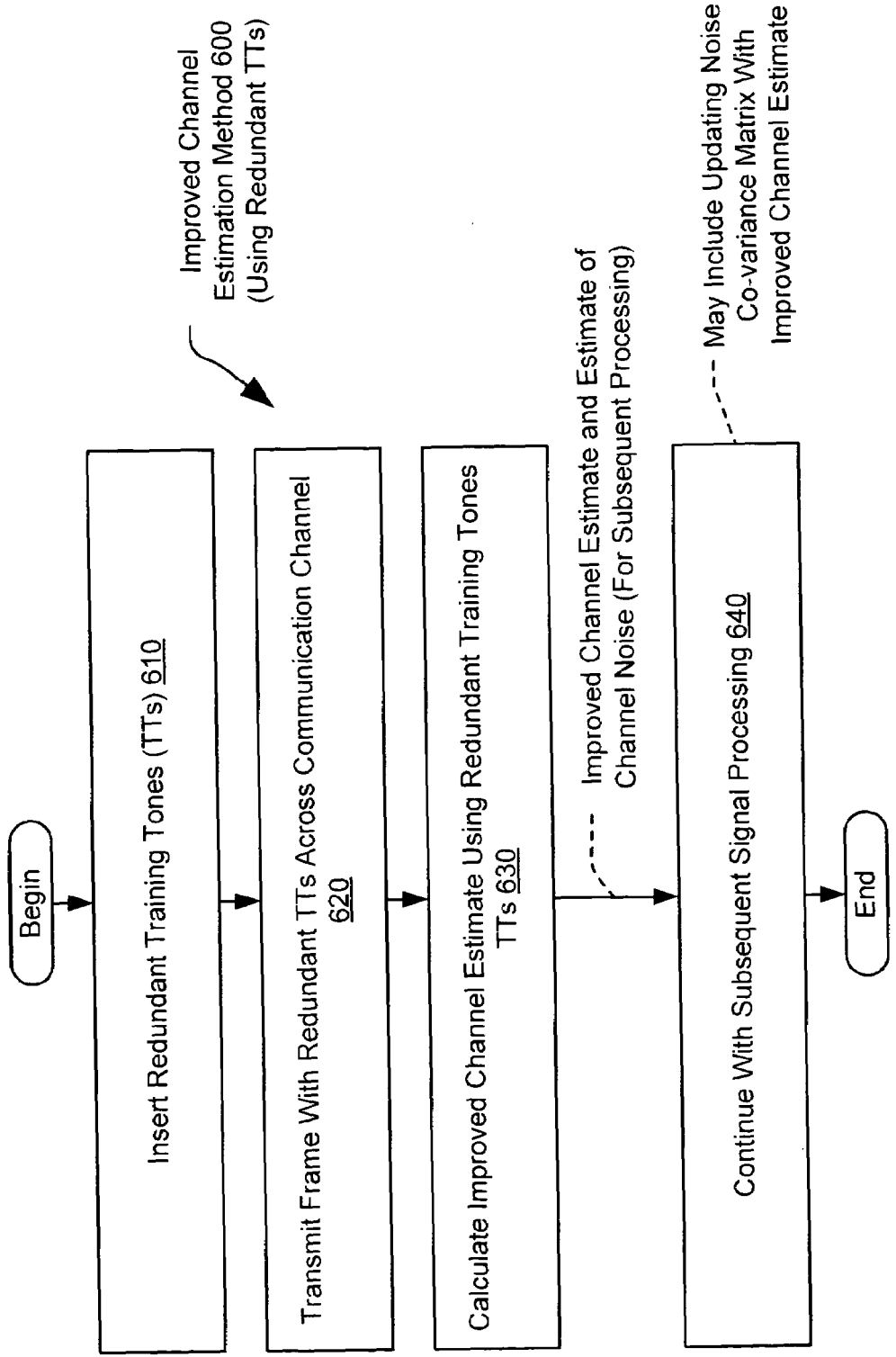
FIG. 6 is a functional block diagram illustrating an embodiment of an improved channel estimation method that is performed in accordance with certain aspects of the present invention using redundant training tones (TTs).

FIG. 6 is a functional block diagram illustrating an embodiment of an improved channel estimation method 600 that is performed in accordance with certain aspects of the present invention using redundant training tones (TTs). In a block 610, redundant training tones (TTs) are inserted into a data frame. That is to say, more TTs are inserted into the data frame within the block 610 that are inserted into prior art data frames. Then, in a block 620, those data frames having the redundant TTs are transmitted across a communication channel. Within a block 630, an improved channel estimate is calculated using the redundant TTs that have been inserted into the data frame that is transmitted across the communication channel in the block 620. The redundant TTs provide for an improved channel estimate and an improved channel noise estimate for any subsequent signal processing.

Then, in a block 640, any additional and subsequent signal processing is performed. Any number of types of communication receivers may employ the improved channel estimation method 600. The subsequent signal processing may include updating a noise co-variance matrix that is used to provide for an improved channel estimation.

Figure 7:
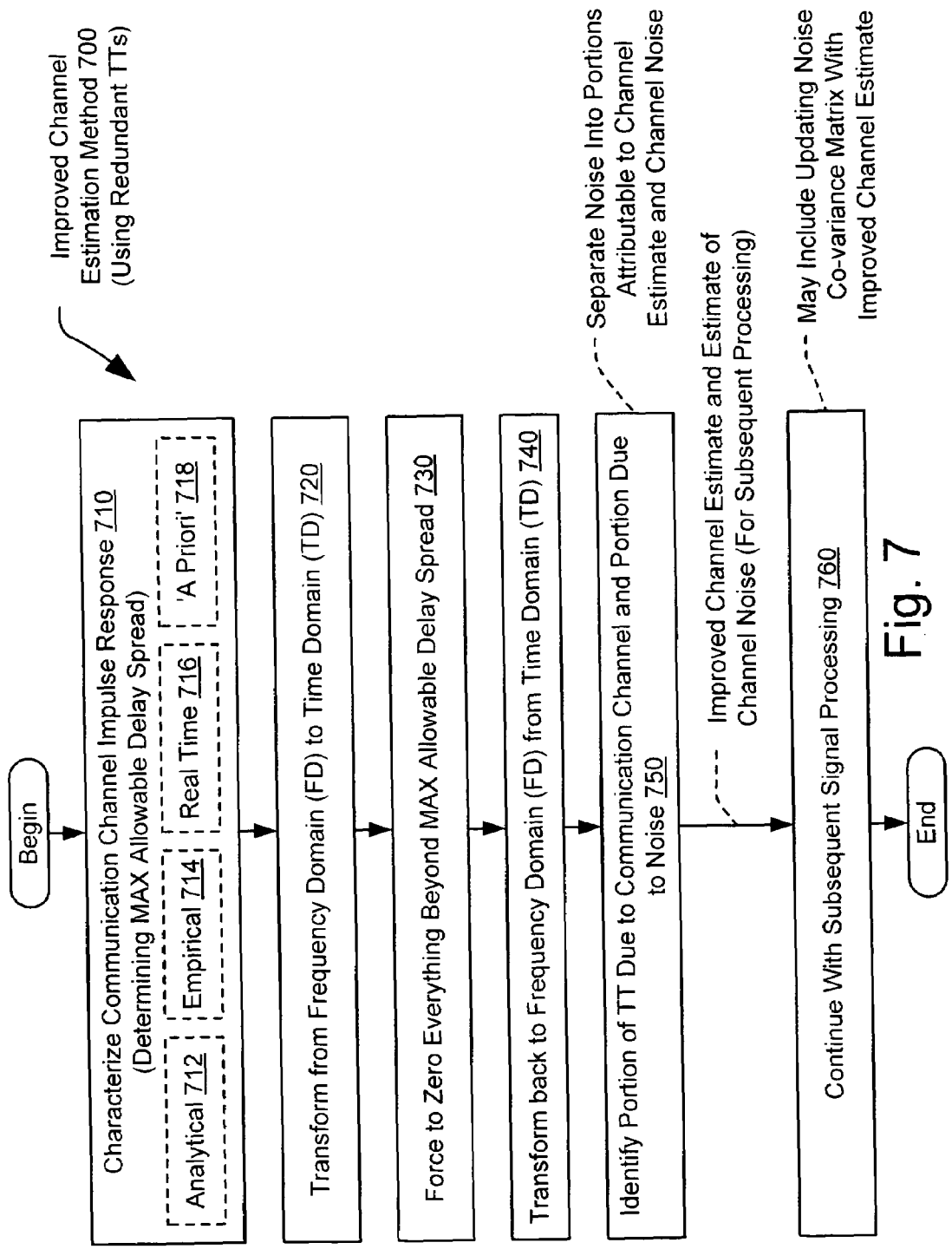
FIG. 7 is a functional block diagram illustrating another embodiment of an improved channel estimation method that is performed in accordance with certain aspects of the present invention using redundant training tones (TTs).

FIG. 7 is a functional block diagram illustrating another embodiment of an improved channel estimation method 700 that is performed in accordance with certain aspects of the present invention using redundant training tones (TTs). In a block 710, a communication channel's finite impulses response (FIR) is characterized to determine a maximum allowable delay spread. This determination may be performed using a number of various means including analytical means 712 and/or using empirical means 714. The determination may be performed in real time, as shown in a functional block 714, and/or 'a priori', as shown in a functional block 718. The determination may be performed using actual data frames that may be received by communication receiver. The empirical means may be viewed as being an experimental means that may be performed in real time, as shown in a functional block 716, using received data frames to learn the maximum allowable delay spread of a multi-path communication channel.

After the communication channel's FIR has been determined in the block 710, using one or more of the various means available, then the response if transformed from the frequency domain (FD) to the time domain (TD) in a block 720. Then, within the TD, the FIR is zeroed beyond the maximum allowable delay spread in a block 730. This zero-ing in the block 730 ensures a better estimate of the communication channel's actual channel response and also ensures a better channel noise estimate. Less noise is consequently introduced into the channel estimate by employing one or more redundant TTs. After this zero-ing has been performed within the time domain, then the response within the time domain is then transformed back to the frequency domain within a block 740. Now, as shown within functional block 750, within the frequency domain, the portion of the TT that is actually due to the communication channel's actual channel response and the portion of the TT that is due to the noise of the communication channel are identified. The noise is separated into portions attributable to the channel estimate and that portion which is actually attributable to noise.

A more improved channel estimate and an improved estimate of the channel noise is then provided for any subsequent signal processing. Again within this embodiment of the present invention, redundant TTs within a data frame provide for an improved channel estimate and an improved channel noise estimate for any subsequent signal processing. In a block 760, any additional and subsequent signal processing is performed. Any number of types of communication receivers may employ the improved channel estimation method 700. The subsequent signal processing may include updating a noise co-variance matrix that is used to provide for an improved channel estimation.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. A communication device that is operable to receive a signal from a communication channel, comprising:
   a channel estimate calculation block that is operable to:
      process a data frame of the signal that is received from the communication channel, wherein the data frame includes a plurality of redundant training tones; and
      employ the plurality of redundant training tones to perform channel estimation of the communication channel; and wherein:
   a minimum plurality of training tones would be required to perform channel estimation of the communication channel based on a maximum allowable delay spread of the communication channel; and
   the plurality of redundant training tones includes at least one more training tone than the minimum plurality of training tones.

2. The communication device of claim 1, wherein:
   the communication channel is a multi-path communication channel.

3. The communication device of claim 1, wherein:
   the communication device employs vector orthogonal frequency division multiplexing.

4. The communication device of claim 1, wherein:
   the communication channel is a multi-path communication channel;
   the channel estimate calculation block is operable to determine a maximum allowable delay spread of the multi-path communication channel using the plurality of redundant training tones; and
   the maximum allowable delay spread corresponds to a maximally dispersed communication path within the multi-path communication channel.

5. The communication device of claim 1, wherein the communication device is operable to:
   determine the maximum allowable delay spread of the communication channel using the plurality of redundant training tones;
   characterize a finite impulse response of the communication channel using the data frame;
   transform the finite impulse response of the communication channel from a frequency domain to a time domain;
   zero a portion of the finite impulse response of the communication channel that is greater than the maximum allowable delay spread; and
   transform the finite impulse response of the communication channel, having the zeroed portion, back from the time domain to the frequency domain.

6. The communication device of claim 1, wherein:
   the communication channel is a multi-path communication channel;

the channel estimate calculation block is operable to determine the maximum allowable delay spread of the multi-path communication channel using the plurality of redundant training tones; and the channel estimate calculation block is operable to determine the maximum allowable delay spread, at least in part, offline.

7. The communication device of claim 1, wherein:
the communication channel is a multi-path communication channel;
the communication device is operable to:
receive a first signal via a first path of the multi-path communication channel; and
receive a second signal via a second path of the multi-path communication channel.

8. The communication device of claim 1, wherein:
the communication device is employed within a communication system that employs at least one of a QPSK coding scheme, a 16 QAM coding scheme, a 64 QAM coding scheme, a 256 QAM coding scheme, and a 1024 QAM coding scheme.

9. The communication device of claim 1, further comprising:
a plurality of antennae that is configured in a spatially diversified manner, each antenna within the plurality of antennae outputs an antenna signal; and
the communication device is operable to combine each of the antenna signals thereby generating the signal that includes the data frame.

10. The communication device of claim 1, wherein:
the communication channel is a wireless communication channel; and
the communication device is a wireless communication device.

11. A communication device that is operable to receive a signal from a communication channel, comprising:
a channel estimate calculation block that is operable to:
process a data frame of the signal that is received from the communication channel, wherein the data frame includes a plurality of redundant training tones;
determine a maximum allowable delay spread of the communication channel using the plurality of redundant training tones; and
employ the maximum allowable delay spread to perform channel estimation of the communication channel; and wherein:
a minimum plurality of training tones is required to perform channel estimation of the communication channel based on the maximum allowable delay spread of the communication channel; and
the plurality of redundant training tones includes at least one more training tone than the minimum plurality of training tones.

12. The communication device of claim 11, wherein:
the communication channel is a multi-path communication channel; and
the maximum allowable delay spread corresponds to a maximally dispersed communication path within the multi-path communication channel.

13. The communication device of claim 11, wherein the communication device is operable to:
characterize a finite impulse response of the communication channel using the data frame;
transform the finite impulse response of the communication channel from a frequency domain to a time domain;
zero a portion of the finite impulse response of the communication channel that is greater than the maximum allowable delay spread; and
transform the finite impulse response of the communication channel, having the zeroed portion, back from the time domain to the frequency domain.

14. The communication device of claim 11, further comprising:
a plurality of antennae that is configured in a spatially diversified manner, each antenna within the plurality of antennae outputs an antenna signal; and
the communication device is operable to combine each of the antenna signals thereby generating the signal that includes the data frame; and wherein:
the communication channel is a multi-path communication channel;
the communication device is operable to:
receive a first signal via a first path of the multi-path communication channel; and
receive a second signal via a second path of the multi-path communication channel.

15. The communication device of claim 11, wherein:
the communication channel is a wireless communication channel; and
the communication device is a wireless communication device.

16. A method, comprising:
receiving a signal from a communication channel;
processing a data frame of the signal that is received from the communication channel, wherein the data frame includes a plurality of redundant training tones; and wherein:
a minimum plurality of training tones would be required to perform channel estimation of the communication channel based on a maximum allowable delay spread of the communication channel; and
the plurality of redundant training tones includes at least one more training tone than the minimum plurality of training tones; and
employing the plurality of redundant training tones to perform channel estimation of the communication channel.

17. The method of claim 16, further comprising:
determining the maximum allowable delay spread of the communication channel using the plurality of redundant training tones, wherein:
the communication channel is a multi-path communication channel; and
the maximum allowable delay spread corresponds to a maximally dispersed communication path within the multi-path communication channel.

18. The method of claim 16, further comprising:
determining the maximum allowable delay spread of the communication channel using the plurality of redundant training tones;
characterizing a finite impulse response of the communication channel using the data frame;
transforming the finite impulse response of the communication channel from a frequency domain to a time domain;
zeroing a portion of the finite impulse response of the communication channel that is greater than the maximum allowable delay spread; and
transforming the finite impulse response of the communication channel, having the zeroed portion, back from the time domain to the frequency domain.

19. The method of claim 16, wherein:
the method is performed within a communication device is employed within a communication system that employs at least one of a QPSK coding scheme, a 16 QAM coding scheme, a 64 QAM coding scheme, a 256 QAM coding scheme, and a 1024 QAM coding scheme.

20. The method of claim 16, wherein:
the communication channel is a wireless communication channel; and
the method is performed within a wireless communication device.

* * * * *